May 13, 1969 I. L. FISCHER ET AL 3,444,537
DIGITAL DATA STORAGE DEVICE INCLUDING MEANS FOR DELIVERING THE STORED DATA AT A PREDETERMINED RATE
Filed Dec. 23, 1965
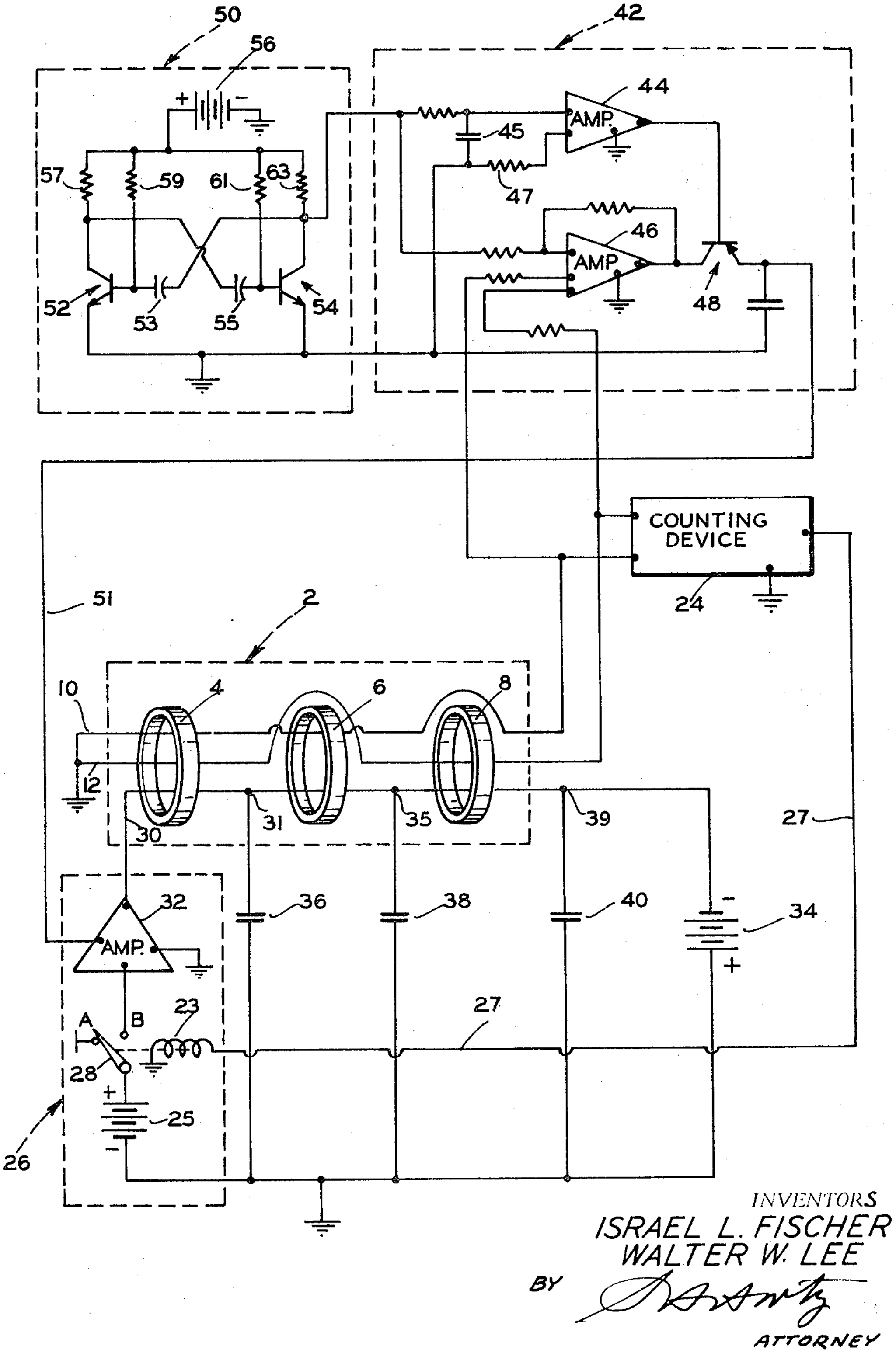
INVENTORS
ISRAEL L. FISCHER
WALTER W. LEE
BY [signature]
ATTORNEY United States Patent Office 3,444,537

Patented May 13, 1969

3,444,537

DIGITAL DATA STORAGE DEVICE INCLUDING MEANS FOR DELIVERING THE STORED DATA AT A PREDETERMINED RATE

Israel Lou Fischer, Harrington Park, and Walter W. Lee, Allendale, N.J., assignors to The Bendix Corporation, a corporation of Delaware Filed Dec. 23, 1965, Ser. No. 515,849
Int. Cl. G11b *5/00*
U.S. Cl. 340—174 9 Claims

ABSTRACT OF THE DISCLOSURE

A digital data storage and data delivery device including a power source and means for varying the output therefrom. Inductive means provide pulses in response to the power output and an oscillator provides pulses at a predetermined rate. The rates of the pulses from the inductive means and from the oscillator are compared and the power output is varied in accordance with the difference between the rates so that the inductive means provides pulses at the predetermined rate.

This invention relates to digital data storage devices and, more particularly, to means for sequentially delivering the stored data.

Cascaded magnetic core arrangements are utilized to store digital data and to deliver the stored data to a counting device in accordance with a predetermined program. The stored data must be delivered at a rate corresponding to a predetermined operating rate of the counting device.

One object of this invention is to provide novel means for delivering stored data from a magnetic storage device in a sequential manner and at a predetermined rate.

Another object of this invention is to provide novel means for synchronizing the rate at which data is sequentially delivered from a magnetic storage device with the predetermined operating rate of a counting device.

This invention contemplates a digital data storage device comprising a power source having means for varying the output therefrom, and inductive means connected to the power source and energized by the output to sequentially provide pulses in accordance with a predetermined program. A counting device having a predetermined operating rate is responsive to the pulses. An oscillator provides pulses at the predetermined operating rate, and a comparator is connected to the oscillator and to the inductive means and compares the pulse rate of the oscillator to the pulse rate of the inductive means to provide a signal corresponding to the difference in the pulse rates. The comparator is connected to the output varying means to control the output of the power source in accordance with the difference signal so that the inductive means provides pulses at the predetermined operating rate.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

The single figure shows a magnetic core digital data storage device embodying the present invention.

In reference to the figure, a data storage device, designated generally by the numeral 2, includes a plurality of cascaded toroidal inductors shown, for purposes of example, as being three in number, and designated by the numerals 4, 6 and 8. Inductors 4, 6 and 8 are fabricated from one of the ferro-magnetic materials having a rectangular hysteresis loop characteristic of high magnetic permeability when the flux density is low and an abrupt reduction in permeability when the flux density is increased.

A plurality of conductors shown, for purposes of example, as being three in number and designated by the numerals 10, 12 and 30 are threaded through inductors 4, 6 and 8. In the figure, conductor 10 is shown as being threaded through inductors 4 and 6 and conductor 12 is shown as being threaded through inductors 4 and 8. Conductors 10 and 12 are connected to a counting device 24 having a predetermined operating rate, and to a comparator designated generally by the numeral 42, which includes an amplifier 44, an integrator having a capacitor 45 and a resistor 47, an amplifier 46 and a switching transistor 48. Conductor 30 is threaded through all of the inductors 4, 6 and 8.

Inductors 4, 6 and 8 in data storage device 2 are energized through inductor 30 by a power source 26 connected thereto and including a battery 25, a switch 28 operated by a solenoid 23, and a high input impedance variable amplifier 32. In accordance with the predetermined program, counting device 24 actuates solenoid 23 through a conductor 27 to move switch 28 from position A to position B, coupling battery 25 to amplifier 32. The output of amplifier 32 is applied to capacitors 36, 38 and 40 through conductor 30. Capacitors 36, 38 and 40 are connected to conductor 30 across power source 26 at points 31, 35 and 39, respectively, point 31 being between inductors 4 and 6, point 35 being between inductors 6 and 8, and point 39 being between inductor 8 and a battery 34. Battery 34 is connected to conductor 30 in opposition to power source 26.

Pulses are induced in conductors 10 and 12 by inductors 4, 6 and 8 at a rate dependent upon the output level of power source 26 in a manner which will be hereinafter described, and in accordance with the predetermined program. A pulse induced in conductor 10 by inductors 4 and 6 and applied to counting device 24 and comparator 42 may, for example, represent the binary digit "0," and a pulse induced in conductor 12 by inductors 4 and 8 and applied to counting device 24 and comparator 42 may represent the binary digit "1."

An oscillator designated generally by the numeral 50 is connected to comparator 42 and includes transistors 52 and 54 coupled through capacitors 53 and 55 with transistors 52 and 54 biased through resistors 57 and 59, and the resistors 61 and 63, respectively, by a battery 56. Oscillator 50 is of the free running multivibrator type, such as that described in Electronics For Scientists, Malmstadt, et al., Benjamin, 1963, page 438, with transistors 52 and 54 being alternately rendered conductive and cut off so as to provide pulses at a rate corresponding to the operating rate of counting device 24 as determined by capacitors 53 and 55. The pulses are applied to comparator 42 which compares the pulse rate of oscillator 50 and the pulse rate of data storage device 2, providing an output corresponding to the difference in the pulse rates. The output is applied to amplifier 32 through a conductor 51 for adjusting the gain of amplifier 32 in proportion thereto.

*Operation*

Initially, inductors 4, 6 and 8 are unsaturated and have a high magnetic permeability. Switch 28 is moved to position B by counting device 24 to connect power source 26 to data storage device 2 and sequentially saturate inductors 4, 6 and 8. Capacitor 36 slowly charges to the output level of power source 26 because of the high impedance of inductor 4. Inductor 4 becomes saturated and a single pulse is induced in each conductor 10 and 12. When inductor 4 is saturated, capacitor 38 slowly charges to the output level of power source 26 because of the high impedance of inductor 6. Inductor 6 becomes saturated and a pulse is induced in conductor 10. When inductor 6 is saturated, capacitor 40 slowly charges to the output level of power source 26 because of the high impedance of inductor 8. Inductor 8 becomes saturated and a single pulse is induced in conductor 12. Pulses are induced in conductors 10 and 12 at a rate corresponding to the time constant of the circuit including conductor 30 and power source 26. The output level of power source 26 is controlled by the gain of amplifier 32.

The coercive forces generated by the magnetic hysteresis of storage device 2 are opposed by the bias supplied to the circuit by battery 34.

Switch 28 is maintained in position A by counting device 24 until inductors 4, 6 and 8 are saturated by power source 26, whereupon counting device 26 actuates solenoid 23 to move switch 28 to position B. Capacitors 36, 38 and 40 discharge to ground level through the internal impedance of battery 34, de-energizing inductors 4, 6 and 8 and resetting data storage device 2.

The pulses from oscillator 50 are integrated by capacitor 45 and resistor 47 and amplified by amplifier 44 of comparator 42 to provide a signal for biasing transistor 48. The pulses from oscillator 50 are further applied to amplifier 46 in comparator 42, to which the pulses from magnetic storage device 2 are also applied. Amplifier 46 provides an output corresponding to the difference in pulse rates of oscillator 50 and magnetic storage device 2, and the output applied to transistor 48 and switched therefrom to amplifier 32 for adjusting the gain of amplifier 32 in accordance with the pulse rate of oscillator 50.

Data storage device 2 provides pulses in a sequential manner and at a rate determined by the output of power source 2, the output being controlled by the gain of amplifier 32. Oscillator 50 provides pulses at the predetermined operating rate of counting device 24. The pulses from data storage device 2 and oscillator 50 are applied to comparator 44 to provide an output from comparator 44 corresponding to the difference between the pulse rate of storage device 2 and the operating rate of counting device 24. The output is applied to amplifier 32, adjusting the gain thereof to change the output level of power source 26, and thereby synchronizing the pulse rate of data storage device 2 with the operating rate of counting device 24.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device for storing digital data and for sequentially delivering the stored data at a predetermined rate, comprising:

a power source having means for varying the output therefrom;

inductive means connected to the power source and energized thereby for sequentially providing pulses in accordance with a predetermined program and at a rate proportional to the output of the power source;

counting means having a predetermined operating rate connected to the inductive means and responsive to the pulses provided thereby;

an oscillator for providing pulses at the predetermined operating rate of the counting means;

a comparator connected to the oscillator and to the inductive means for comparing the pulse rates of the oscillator and of the inductive means and for providing an output corresponding to the difference in the pulse rates;

and the comparator being connected to the amplitude varying means for varying the output of the power source in accordance with the output of the comparator to provide pulses from the induction means at the predetermined rate.

2. A device as defined in claim 1, wherein:

the inductive means comprises a plurality of inductors of ferro magnetic material having a rectangular hyteresis loop so that the inductors have a high magnetic permeability when the flux density is low and a low magnetic permeability when the flux density is high;

and each of the inductors is initially in a state of low magnetic flux density.

3. A device as defined in claim 2, including:

a plurality of conductors selectively arranged inductively with the inductors, each conductor associated with a least one inductor so that the voltage induced in the conductors corresponds to a predetermined digital program.

4. A device as defined in claim 3, wherein:

the inductors are toroidal in shape;

and the conductors are threaded through the inductors.

5. A device as defined in claim 3, including:

a conductor threaded through each of the inductors for sequentially saturating the inductors;

and capacitors connected to the conductor between the inductors and across the power source and charged sequentially by the power source so that the inductors are sequentially saturated and pulses induced in the associated conductors.

6. A device as defined in claim 1, including:

power means connected to the inductive means in opposition to the power source to oppose coercive forces caused by magnetic hysteresis of the inductive means.

7. A device as defined in claim 1 wherein the power source having means for varying the amplitude of the output thereof, comprises:

a source of direct current;

a variable gain amplifier;

and a switch connecting the source of direct current to the amplifier and controlled by the counting means.

8. A device as defined in claim 7, wherein:

the comparator is connected to the amplifier to adjust the gain thereof in proportion to the difference between the pulse rate of the inductive means and the pulse rate of the oscillator to provide pulses at the predetermined rate.

9. A device as described in claim 1, wherein the comparator includes:

an integrator connected to the oscillator for integrating the pulses therefrom and for providing a first signal;

a first amplifier connected to the integrator for amplifying the integrated pulses;

a second amplifier connected to the oscillator and connected to the inductive means and responsive to the pulses from the oscillator and the inductive means for comparing the respective pulse rates thereof and for providing a second signal corresponding to the difference therebetween;

and an electronic control device connected to the first amplifier and to the second amplifier for controlling the output of the power source in response to the first and second signals.

References Cited

UNITED STATES PATENTS 3,160,862 12/1964 Adams ............ 340—174

BERNARD KONICK, *Primary Examiner.*

BARRY L. HALEY, *Assistant Examiner.*

U.S. Cl. X.R.

307—88